United States Patent [19]

Yamaguchi et al.

[11] Patent Number: 4,989,898
[45] Date of Patent: Feb. 5, 1991

[54] ENERGY ABSORPTION TYPE STEERING APPARATUS

[75] Inventors: Mikio Yamaguchi; Sakae Matsumoto, both of Takasaki, Japan

[73] Assignee: Nippon Seiko Kabushiki Kaisha, Tokyo, Japan

[21] Appl. No.: 403,949

[22] Filed: Sep. 7, 1989

[51] Int. Cl.⁵ .............................................. B62D 1/19
[52] U.S. Cl. ...................................... 280/777; 74/492
[58] Field of Search .................. 280/777; 74/492, 493, 74/496

[56] References Cited

U.S. PATENT DOCUMENTS

| | | | |
|---|---|---|---|
| 3,600,971 | 8/1971 | Scarvelis | 74/492 |
| 3,740,068 | 6/1973 | Arata | 280/777 |
| 3,944,244 | 3/1976 | Albrecht | 280/777 |
| 4,102,217 | 7/1978 | Yamamoto | 280/777 |
| 4,330,139 | 5/1982 | Katayama | 74/493 |
| 4,630,716 | 12/1986 | Faust | 280/777 |
| 4,632,424 | 12/1986 | Morris | 280/777 |
| 4,786,076 | 11/1988 | Wierschem | 280/777 |
| 4,838,576 | 6/1989 | Hamasaki et al. | |
| 4,901,592 | 2/1990 | Ito et al. | 74/492 |

FOREIGN PATENT DOCUMENTS

| | | | |
|---|---|---|---|
| 2604214 | 8/1977 | Fed. Rep. of Germany | 74/492 |
| 2821707 | 11/1978 | Fed. Rep. of Germany | 280/777 |
| 53-156230 | 12/1978 | Japan | |
| 59-46828 | 11/1984 | Japan | |
| 60-127285 | 8/1985 | Japan | |
| 62-187652 | 8/1987 | Japan | 74/492 |
| 63-46972 | 2/1988 | Japan | |

Primary Examiner—Richard A. Bertsch
Attorney, Agent, or Firm—Shapiro and Shapiro

[57] ABSTRACT

An energy absorption type steering apparatus, which comprises a steering shaft with a steering wheel mounted on its rear end, a steering column rotatably supporting the steering shaft, a column bracket mounting said steering column for axially forward movement on a vehicle portion, an energy absorption box secured to the vehicle portion, and a deformable member having one end secured to the energy absorption box and another end extending from the energy absorption box and engaging, with an axial play, a projection formed on the steering column, the deformation member having a U-shaped folding portion and also having a flaring plastic deformation portion accommodated in the energy absorption box and flaring toward the aforementioned one end. The plastic deformation portion of the deformable member is restrained between upper and lower walls of the energy absorption box such that the load on the plastic deformation portion is gradually increased as a U-shaped folding portion is progressively shifted with constant radius of curvature.

1 Claim, 4 Drawing Sheets

ENERGY ABSORPTION TYPE STEERING APPARATUS

BACKGROUND OF THE INVENTION

1. Field of the Invention

This invention relates to improvements in energy absorption type steering apparatus. As used herein the term "energy absorption type steering apparatus" refers to a steering apparatus in which a steering shaft with a steering wheel mounted on its upper (rear) end and having its lower (forward) end coupled via a joint to a steering gear is rotatably supported on a hollow steering column mounted on vehicle such as to permit only forward and downward movement, and an energy absorption unit consisting of a curved plate or the like is provided between the steering column and vehicle, such that with downward forward movement of the steering shaft and steering column during a collision, the plate member of the energy absorption unit undergoes plastic deformation to absorb the energy of collision.

2. Related Background Art

An energy absorption type steering apparatus of this type is disclosed in Japanese Utility Model Laid-Open No. 53-156230. In this apparatus, an energy absorption plate having a folded portion has one end secured to a portion of vehicle and the other end secured to a steering column. When the steering column is displaced forwardly with an impact force at the time of a collision of the vehicle, the folded portion of the energy absorption plate undergoes plastic deformation to absorb the energy of impact.

As an other example, according to Japanese Patent Application Laid-Open No. 63-46972, a W-shaped deformable wire is locked to a steering column and accommodated in an energy absorption box secured to a vehicle portion such as to be restrained by upper and lower walls and left and right side walls, and at the time of a collision the folded end of the deformable member is brought into contact with an end wall of the energy absorption box to cause plastic deformation of the wire.

In the prior art structure disclosed in Japanese Utility Model Laid-Open No. 53-156230 there is provided no means for restricting the state of plastic deformation of the folded portion. Therefore, it is difficult to provide a fixed plastic deformation resistance of the energy absorption plate for a displacement stroke of the steering column.

In the case of the structure where the deformable wire is accommodated in the energy absorption box, the plastic deformation of the deformable wire can be regulated or controlled by the energy absorption box. Thus, the energy of collision can be reliably absorbed at a fixed rate. In addition, the deformable wire can be readily obtained with a process of bending a single wire. Therefore, the structure is low in cost and is advantageous in that it can be disposed in a narrow space. However, the load characteristic (displacement of column versus deforming force of the deformable wire) is substantially constant at the time of energy absorption. In order to let the deformation be proportional to the displacement of the steering column, the deformable wire should be produced from a non-uniform diameter wire having progressively increasing diameter. This poses difficulties in manufacture.

SUMMARY OF THE INVENTION

An object of the invention is to provide an energy absorption type steering apparatus, which permits gradual or step-wise increase of the energy absorption load according to the displacement of the steering column, can be very readily manufactured, and requires small installation space.

According to the invention, there is provided an energy absorption type steering apparatus, which comprises a steering shaft with a steering wheel mounted on the rear end, a steering column for rotatably supporting the steering shaft, a column bracket mounting the steering column on a portion of a vehicle for axially forward movement, an energy absorption box secured to the vehicle portion, and a deformable member having one end secured to the energy absorption box and the other end extending from the energy absorption box and engaging with an axial play a projection formed on the steering column, the deformable member having a U-shaped folding portion and also having a flaring plastic deformation portion accommodated in the energy absorption box and flaring toward one end, the plastic deformation portion of the deformable member being restrained between upper and lower walls of the energy absorption box such that the load on the plastic deformation portion is gradually increased as a U-shaped folding portion is progressively shifted with a constant radius of curvature.

When a collision occurs, the steering column and deformable member are locked to each other with a displacement of the steering column in excess of a predetermined stroke, and the deformable member is moved obliquely downwardly (forwardly) together with the steering column, thus undergoing plastic deformation in the energy absorption box to absorb energy. The plastic deformation proceeds at a fixed rate in the direction of the length of the deformable member with of the plastic deformation portion of the deformable member restricted by the energy absorption box. The width of the plastic deformation portion of the deformable member increases gradually in the longitudinal direction. Therefore, deformation load is gradually increased with movement of the plastic deformation portion, thus causing great energy absorption to maintain a substantially constant impact force given to the driver.

DESCRIPTION OF THE PREFERRED EMBODIMENTS

Preferred embodiments of the invention will now be described with reference to the drawings.

Figure 1:
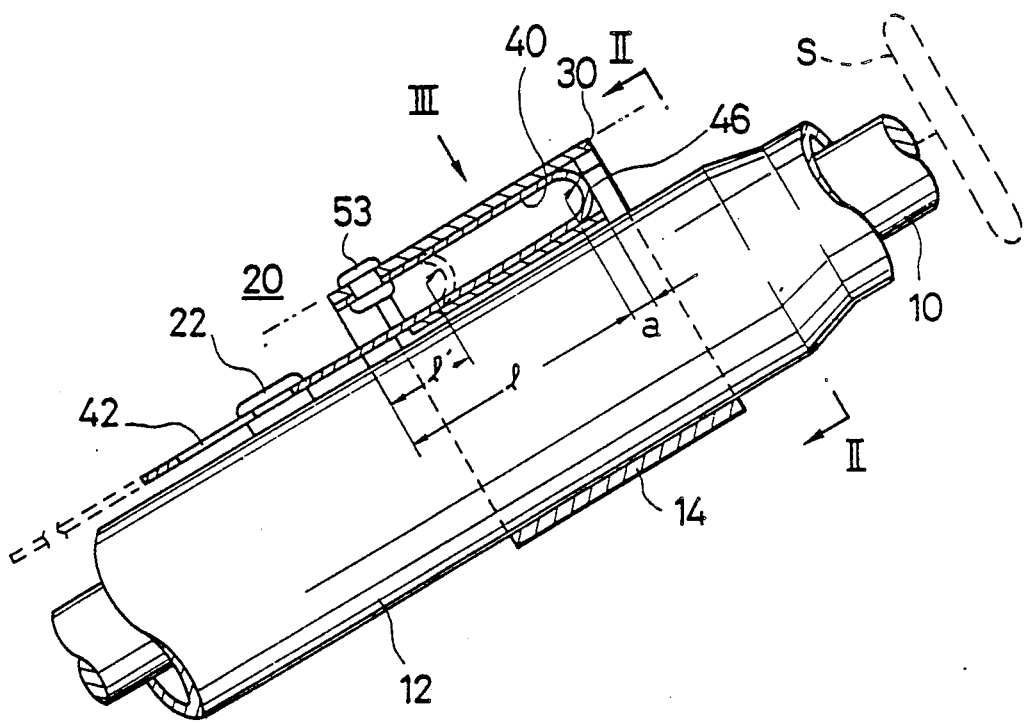
FIG. 1 is a fragmentary side sectional view showing a first embodiment of the energy absorption type steering apparatus according to the invention.
Figure 2:
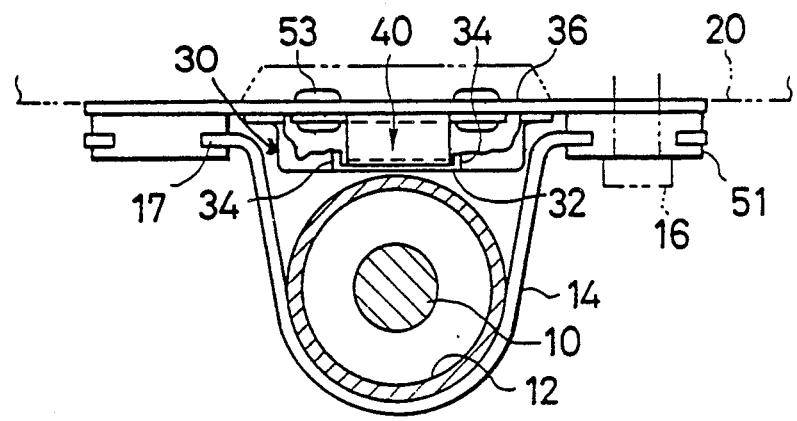
FIG. 2 is a sectional view taken along line II—II in FIG. 1.

Referring to FIGS. 1 and 2, a steering wheel indicated diagrammatically at S is secured to the upper or rear end of the steering shaft 10. The lower or forward end of the steering shaft 10 is secured to the steering gear (not shown) either directly or via a coupling. The steering shaft 10 is rotatably supported in a hollow steering column 12. The steering column 12, as shown in FIG. 2, is secured by a substantially U-shaped column bracket 14 and a bolt 16 to a portion 20 of a vehicle. A mounting portion 17 of the column bracket 14 has notches 19 (see FIG. 4) open in one direction (i.e., toward the steering wheel). The steering shaft 10 and steering column 12 extend obliquely downwardly in a forward direction toward the steering gear.

Figure 3:
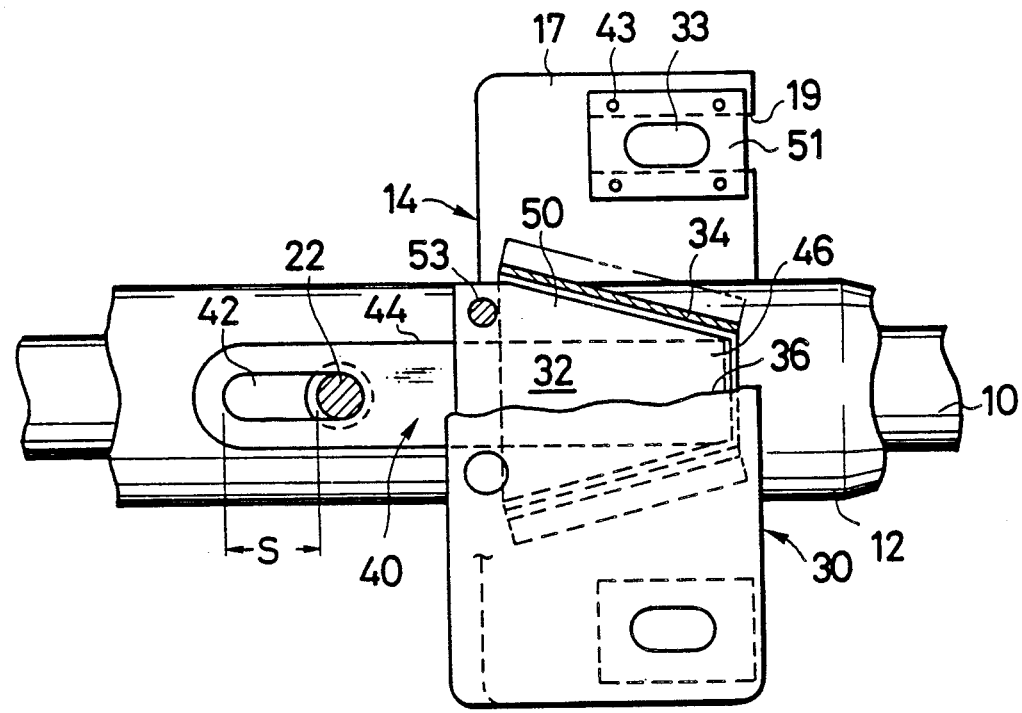
FIG. 3 is a partly broken-away top view taken in the direction of arrow III in FIG. 1.

As shown in FIGS. 1 to 3, the steering column 12 has a projection 22 projecting from a portion of the outer periphery (corresponding to the vehicle portion 20) and having a constricted intermediate portion. An energy absorption box 30 is mounted on vehicle portion 20 at a position surrounded by the U-shaped column bracket 14, as shown in FIG. 2.

Figure 4:
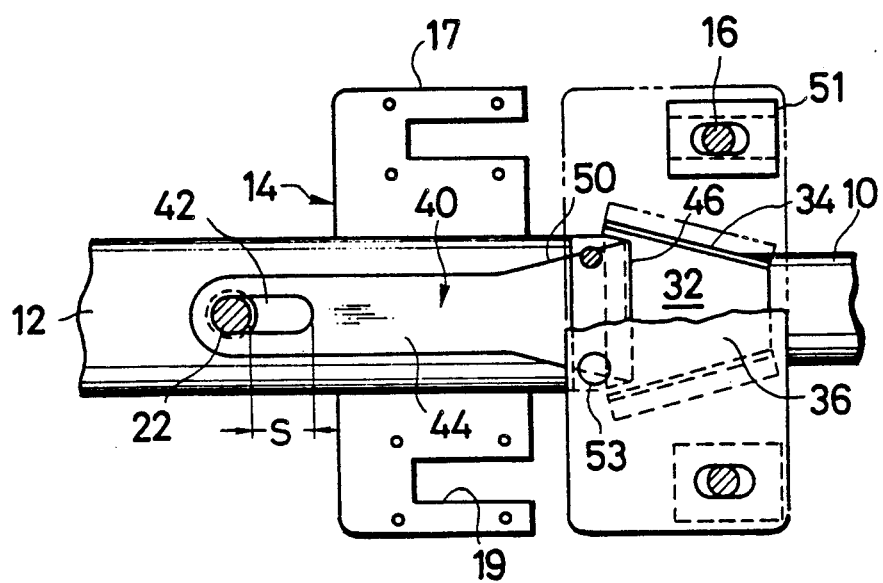
FIG. 4 is a view similar to FIG. 3 but showing the embodiment after collision and plastic deformation.

The energy absorption box 30, as shown in FIGS. 1 to 4, has a top wall 36 having substantially the same width and length as the column bracket 14, a pair of side walls 34 formed on the top wall 36 at laterally intermediate positions thereof and inclined with respect to the axial direction, and a flat bottom 32 connecting the side walls 34. As shown in FIGS. 3 and 4, the space between the pair of side walls 34 flares outwardly as viewed from the steering wheel towards the steering gear. A washer-like grooved member 51, a so-called capsule, having a well-known construction with a slot 33 is mounted on the lower surface of the top wall 36 adjacent to each side thereof. A portion of the column bracket 14 with the notch 19 is inserted in a side groove of each capsule 51 and secured to the same by shear pins 43 formed by extrusion molding of a resin. A bolt 16 is inserted through the notch 19, slot 33 and a through hole of the top wall 36 of the energy absorption box 30 into the vehicle portion 20, whereby the bracket 14 and energy absorption box 30 are secured to the vehicle portion 20. The steering column 12 is secured by welding or like means to the column bracket 14. It is possible to secure the column bracket 14 and energy absorption box 30 to the vehicle portion 20 without use of capsules 51; for example, they may be secured to the vehicle portion via a channel-shaped sliding plate having a slot or by forming a slot in the top wall 36 of the box 30. When the sliding plate is used, "Teflon" or like material is desirably coated on the contact surface of the mounting portion 17 of the bracket 14 or the sliding plate.

Figure 5:
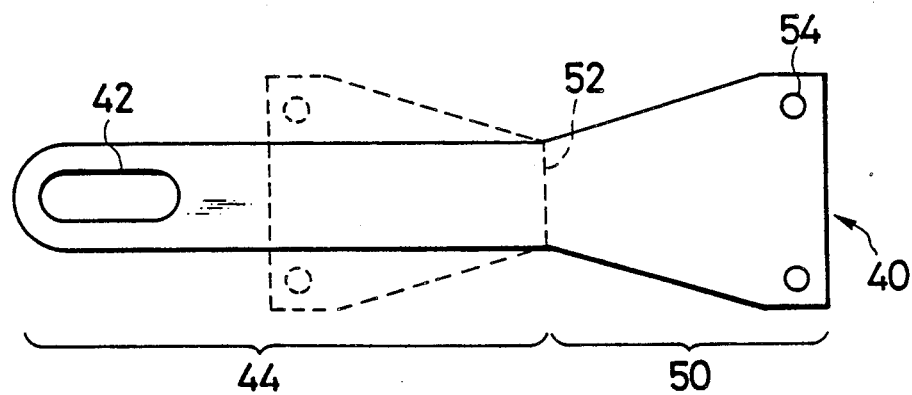
FIG. 5 is a developed view showing a deformable plate in a first embodiment of the invention.

A strip-like deformable member 40, as shown in a developed state in FIG. 5, is provided in an arcuately folded state between the projection 22 of the steering column 12 and energy absorption box 30. The member 40 has a straight portion 44 extending toward the steering gear and a flaring portion 50 flaring toward the opposite end for receiving plastic deformation. The straight portion 44 is formed near its free end with a slot 42 is received, in which the constricted portion of the projection 22, and the flaring portion 50 is formed near the flaring end with holes 54 for rivetting the member 40 by rivets 53 to an axially forward end portion of the top wall 36 of the energy absorption box 30. As shown in FIGS. 1 to 3, the arcuately or semi-circularly folded portion 46 of the member 40 is located near the rear end of the energy absorption box 30 on the steering wheel side, the straight portion 44 extends from the folded portion along the steering column 12 toward the gear side, and the projection 22 of the column 12 is inserted in the rear (i.e., steering wheel side) end of the slot 42 of the straight portion 44, providing a length S (FIG. 3) between the projection 22 and the front (i.e., steering gear side) end of the slot 42. The straight portion of the member 40 in the energy absorption box 30 is in contact with the bottom 32 of the box 30. The outer surface of the folded flaring portion 50 is in contact with the top wall 36 of the energy absorption box 30, and the flaring edge of the folded portion is in the proximity of or in contact with the side walls 34 of the box 30.

The operation of the first embodiment will now be described.

When collision of the vehicle occurs, with so-called secondary collision the mounting portion 17 of the column bracket 14 is caused to slide along and detach from the capsules 51, so that the steering column 12 and column bracket 14 are shifted obliquely downwardly in a forward direction. This movement takes place as the injection molded shear pins are sheared apart. With the movement of the steering column 12 the projection 22 is moved in the same direction along the slot 42 of the member 40 into engagement with the front end of the slot 42. As a result, the member 40 is strongly pulled in the same direction by the projection 22. This causes plastic deformation of a portion of the member 40 including the folded portion 46 and flaring portion 50 in the energy absorption box 30 (so that the position of the folded portion 46 is gradually shifted forward and closer to the flared end). In this arrangement, the portion of the member 40 that is plastically deformed is interposed between the top wall 36 and bottom 32 of energy absorption box 30 substantially without any play in the height and thickness directions. Also, in the width direction of the member 40 the flaring end is restrained by the side walls 34 of the box 30. Thus, the folded portion 46 is confined by the top, bottom, and side walls at the time of plastic deformation, and a fixed shape (or radius of curvature) of the folded portion 46 can be maintained. The plastic deformation of the member 40 thus causes energy absorption reliably at a fixed rate of increase prescribed by the increase of width dimension of the member 40.

Figure 7:
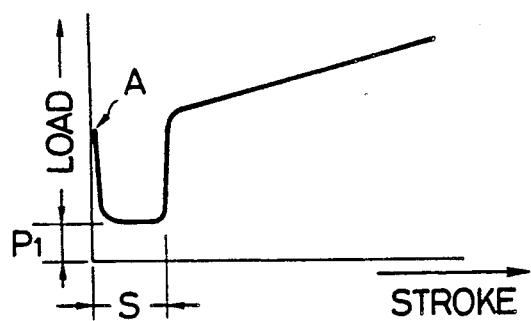
FIG. 7 is a graph showing a load characteristic (energy absorption characteristic) of the first embodiment.

FIG. 7 shows a load characteristic of the first embodiment, i.e., the relation between displacement of the steering column and plastic deformation load of the deformable member. Since the deformable member has the flaring portion that is subjected to plastic deformation, the deformation load increases with the displacement of the column. In the Figure, point A designates a load at the time of detachment of the steering column, i.e., at the time of shearing-apart of the shear pins. Designated at S is a range of initial displacement of the steering column without plastic deformation of the deformable member after detachment of the column. Referring to FIG. 1, wherein l and l' respectively represent one-half the length of member 40 within box 30 before and after deformation, it will be appreciated that with the deformation of the deformable member 40 by 2(l−l') the steering column 12 is moved by S+2(l−l').

Figure 6:
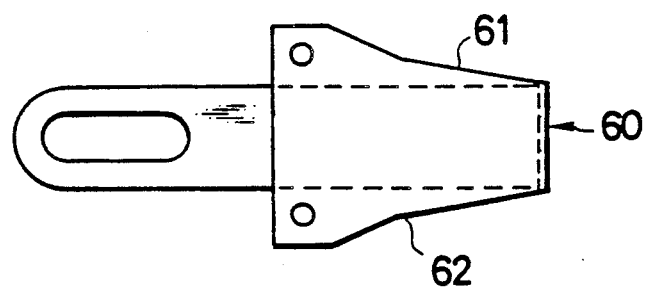
FIG. 6 is a plan view showing a deformable member in a second embodiment of the invention.
Figure 8:
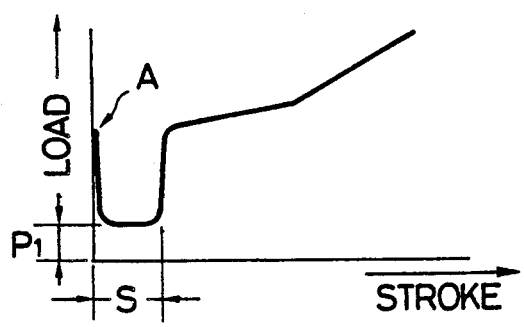
FIG. 8 is a graph showing a load characteristic of the second embodiment.

FIG. 6 is a plan view showing a deformable member of a second embodiment of the invention. In this embodiment, the deformable member 60 has a plastically deformable portion 61 flaring in two steps. Around the junction 62 of the two different flaring portions, the load characteristic changes in the manner as shown in FIG. 8. In FIGS. 7 and 8, load P1 is based on the wear resistance between capsules 51 and column bracket mounting portion 17 sliding relative thereto. The shape of the deformable member is not limited to those in the above embodiments, and it is possible to select any desired shape to obtain a corresponding load characteristic.

As has been described in the foregoing, according to the invention an energy absorption box is mounted on a vehicle portion, a strip-like deformable member having a U-shaped folded portion partly constituted by a plastically deformable portion flaring toward one end is mounted in the energy absorption box, and the projection of the steering column is engaged in a slot formed in the deformable member near the front end thereof. Thus, the plastic deformation of the member is regulated and controlled by the energy absorption box to permit reliable absorption of collision energy at a predetermined rate for safety of the driver. Further, since the deformable member is obtained from a plate- or sheet-like member, its width can be set as desired, thus permitting its design to provide an appropriate energy absorption characteristic for the vehicle. The deformable member can be readily fabricated in mass production, and it can be disposed along with the energy absorption box in the narrow space defined by the steering column and vehicle portion. Thus, it is possible to provide a small-size and low cost energy absorption type steering apparatus.

We claim:

1. An energy absorption type steering apparatus comprising a steering shaft with a steering wheel mounted on a rear end thereof, a steering column rotatably supporting said steering shaft, a column bracket mounting said steering column on a portion of a vehicle for axially forward movement, an energy absorption box secured to said vehicle portion, and a deformable plate member having one end secured to said energy absorption box and another end extending forwardly from said energy absorption box, said another end having a slot extending axially of said steering column and engaging a projection formed on said steering column with forward axial play, said deformable plate member having an intermediate portion folded into a U-shape accommodated in said energy absorption box and restrained between upper and lower walls of said energy absorption box such that during a collision of the vehicle the U-fold of said intermediate portion is progressively shifted forward with a constant radius of curvature by collision-energy-absorbing plastic deformation of a plastic deformation portion of said intermediate portion, said plastic deformation portion flaring adjacent to and toward said one end at a first angle and then at a second angle greater than said first angle such that loading of said plastic deformation portion increases at a first rate and then at a second rate greater than said first rate as said plastic deformation progresses along said plastic deformation portion.

* * * * *